United States Patent
Garcia et al.

(10) Patent No.: US 12,541,922 B2
(45) Date of Patent: Feb. 3, 2026

(54) METHOD FOR GENERATING A MODEL FOR REPRESENTING RELIEF BY PHOTOGRAMMETRY

(71) Applicant: Airbus Defence and Space SAS, Toulouse (FR)

(72) Inventors: Emmanuel Garcia, Toulouse (FR); Philippe Nonin, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 138 days.

(21) Appl. No.: 18/326,559

(22) Filed: May 31, 2023

(65) Prior Publication Data

US 2023/0394760 A1 Dec. 7, 2023

(30) Foreign Application Priority Data

Jun. 2, 2022 (FR) ...................................... 2205303

(51) Int. Cl.
*G06T 17/05* (2011.01)
(52) U.S. Cl.
CPC .......... *G06T 17/05* (2013.01); *G06T 2210/61* (2013.01)
(58) Field of Classification Search
CPC ........... G06T 17/05; G06T 2207/10021; G06T 2207/10032; G06T 2210/61; G06T 7/593
See application file for complete search history.

(56) References Cited

U.S. PATENT DOCUMENTS

| | | | |
|---|---|---|---|
| 10,839,543 B2* | 11/2020 | Cheng | G06V 10/454 |
| 2018/0147062 A1* | 5/2018 | Ay | G06T 17/00 |
| 2020/0318962 A1* | 10/2020 | Gold | G01C 3/02 |

OTHER PUBLICATIONS

Aati, Saif, & Jean-Philippe Avouac, Optimization of optical image geometric modeling, application to topography extraction and topographic change measurements using PlanetScope and SkySat imagery. (2020), Remote Sensing, 12(20), 3418. doi:https://doi.org/10.3390/rs12203418 (Year: 2020).*

(Continued)

*Primary Examiner* — Alicia M Harrington
*Assistant Examiner* — Brianna Renae Cochran
(74) *Attorney, Agent, or Firm* — Greer, Burns & Crain, Ltd.

(57) ABSTRACT

A method for generating a relief representation model using a plurality of N pairs of stereo images, each of the N pairs of stereo images being associated with a map of photogrammetric disparities which is obtained by correlation calculation based on the pair of stereo images in question, comprises: a calculation of maps of geometric disparities based on a predetermined relief representation model, by projection of the predetermined relief representation model into an epipolar geometry of the pairs of stereo images; a calculation of a cost function, representative of a difference between the geometric and photogrammetric disparities, associated with the predetermined relief representation model; and an updating of the predetermined relief representation model by optimization of the gradient descent type of the cost function, and iteration until a predefined endpoint criterion is reached. Also a computer program and a system.

8 Claims, 5 Drawing Sheets

(56) References Cited

OTHER PUBLICATIONS

Lu, Y., & Kubik, K.. Stereo image matching using robust estimation and image analysis techniques for DEM generation, (2000) Proceedings of the International Archives of Photogrammetry and Remote Sensing, 33. (Year: 2000).*

Majumder, Aditi, and M Gopi. "Epipolar Geometry." Introduction to Visual Computing, (2018), 1st ed. vol. 1. CRC Press, 2018. Chapter 8 177-198. Web. (Year: 2018).*

French Search Report for corresponding French Patent Application No. 2205303 dated Jan. 11, 2023; priority document.

S. Ruano et al., "Aerial Video Geo-Registration Using Terrain Models From Dense and Coherent Stereo Matching" Proceedings of Spie, IEEE, US, vol. 9089, Jun. 18, 2014.

M. Rossi, et al., "Joint Graph-Based Depth Refinement and Normal Estimation" 2020 IEEE/CVF Conference on Computer Vision and Pattern Recognition (CVPR), IEEE, Jun. 13, 2020.

M. Shen, et al., "Vision Based Terrain Reconstruction for Planet Rover Using a Special Binocular Bundle Adjustment" Journal of Zhejiang University Science A, Zheijian University Press, CN, vol. 9, No. 10, Oct. 1, 2008.

* cited by examiner

METHOD FOR GENERATING A MODEL FOR REPRESENTING RELIEF BY PHOTOGRAMMETRY

CROSS-REFERENCES TO RELATED APPLICATIONS

This application claims the benefit of French Patent Application Number 2205303 filed on Jun. 2, 2022, the entire disclosure of which is incorporated herein by way of reference.

FIELD OF THE INVENTION

The present invention relates to the field of the generation of models representing relief by photogrammetry.

BACKGROUND OF THE INVENTION

The generation of a model representing relief, such as a digital surface model (DSM) or a digital elevation model (DEM), by photogrammetry consists in reconstructing a scene in three dimensions (3D) using the parallax obtained between stereo images, for example acquired by satellite, of the scene. Photogrammetry takes its inspiration from human stereoscopic vision for reconstructing the relief of the scene based on the difference in points of view offered by stereo images. For this purpose, calculations of the correlation between the stereo images are carried out and used to reconstruct the scene.

One usual technique for generating a model for representing relief is shown schematically in FIG. 1.

In a step 110, a data processing system obtains a plurality of pairs of stereo images of the scene, thus constituting a set of N pairs of stereo images 120 covering a region of interest (ROI) or an area of interest (AOI).

In a step 130, the data processing system generates a plurality of unitary relief representation models, each obtained by virtue of a said pair of stereo images 120. For each of the N pairs of stereo images, the step 130 comprises a first sub-step 131 for calculating a correlation between the stereo images of the said pair, followed by a sub-step 132 for converting the correlation results into unitary relief representation models. N unitary relief representation models are thus obtained, independently from one another, using each of the N pairs of stereo images in parallel (or sequentially).

Subsequently, in a step 140, the data processing system merges the N unitary relief representation models so as to form a final relief representation model of the region of interest ROI or of the area of interest AOI.

In a bit more detail, such as illustrated in FIG. 2, the step 132 for converting the correlation results into unitary relief representation models is carried out, for each of the N pairs of stereo images, by virtue of a step 1321 for triangulation in 3D carried out based on a map of photogrammetric disparities 201, on a map of correlation scores 202 and on an epipolar geometry of the stereo images 203. The epipolar geometry of the stereo images 203 supplies information on correspondence between points of relief and pixels of epipolar images. The map of photogrammetric disparities 201, the map of correlation scores 202, and the epipolar geometry of the stereo images 203 are obtained by execution of the correlation calculation step 131 for the pair of stereo images in question.

For the pair of stereo images being considered, the 3D triangulation step 1321 allows a network of points to be obtained in 3D 1322, which is subsequently converted, in a step 1323, into a relief representation model. A unitary relief representation model 205 and a quality map 206 are thus obtained at the output of the step 132, for each of the N pairs of stereo images. The unitary relief representation models 205, accompanied by their respective quality maps 206, are then merged in order to form the finished relief representation model corresponding to the region of interest ROI or to the area of interest AOI.

One drawback of the approach described hereinabove resides in the loss of information linked to the conversion of the unitary correlation results (i.e. per pair of stereo images) into unitary relief representation models, and to the later merging of these unitary relief representation models so as to form the finished relief representation model. Indeed, a relief representation model cannot capture all the information present in a correlation result. One typical example is that overhanging terrain structures cannot be represented in a digital elevation model, whereas these overhanging terrain structures may be represented in the correlation result. Another example is that the relief representation model is sampled over a certain grid, which is distinct from the grid over which the correlation calculation is carried out; the passage from one grid to the other involves a re-sampling which necessarily degrades the information.

It is accordingly desirable to overcome at least this drawback of the prior art, and to do this in a simple, efficient and inexpensive manner. It is notably desirable to provide a solution which limits the loss of information in the generation of a relief representation model by photogrammetry.

SUMMARY OF THE INVENTION

For this purpose, a method is provided for generating a relief representation model based on a plurality of N pairs of stereo images, each of the N pairs of stereo images being associated with a map of photogrammetric disparities which is obtained by correlation calculation from the pair of stereo images in question, the method being characterized in that it comprises the following iterative steps: calculation of maps of geometric disparities based on a predetermined relief representation model, by projection of the predetermined relief representation model into an epipolar geometry of the pairs of stereo images; calculation of a cost function, representative of a difference between the geometric and photogrammetric disparities, associated with the predetermined relief representation model; and updating of the predetermined relief representation model by optimization of the gradient descent type of the cost function, and iteration until a predefined endpoint criterion is reached.

Thus, by virtue of the calculation of the cost function comparing the geometric and photogrammetric disparities, the relief representation model converges towards a solution which limits the loss of information by avoiding having to make use of a conversion of the unitary correlation results. Indeed, in this method, the relief representation model thus takes into account all of the N pairs of stereo images instead of proceeding by pair of stereo images.

In one particular embodiment, the cost function CF is expressed thus:

$$CF = \sum_k \sum_{(i,j)} W_{k,0}(i,j) N_m(D_k(i,j) - D_{k,0}(i,j))$$

where k is a running index of the N pairs of stereo images, $N_m$ is a normalization function, $D_k(i,j)$ is the disparity value for the pixel (i,j) in the map of geometric disparities associated with the pair of stereo images pointed to by the value of the index k, and $D_{k,0}(i,j)$ is the disparity value for the pixel (i,j) in the map of photogrammetric disparities associated with the pair of stereo images pointed to by the value of the index k, and $W_{k,0}(i,j)$ is the corresponding value for the pixel (i,j) in an associated map of correlation scores, following the calculation of correlation with the said map of photogrammetric disparities associated with the pair of stereo images pointed to by the value of the index k.

In one particular embodiment, the normalization function is the Huber pseudo-norm applied thus:

$$N_m(x) = \begin{cases} |x| - \frac{1}{2}, & |x| \geq 1 \\ \frac{x^2}{2}, & |x| < 1 \end{cases}$$

In one particular embodiment, the cost function CF is adjusted with a term R for regularization of the relief representation model, in such a manner that:

$$ACF = \lambda.R + CF = \lambda.R + \sum_k \sum_{(i,j)} W_{k,0}(i,j) N_m(D_k(i,j) - D_{k,0}(i,j))$$

where $\lambda$ is a weighting factor for regularization of the relief representation model and ACF is the adjusted cost function.

In one particular embodiment, the term R for regularization of the relief representation model is the total variation of the relief representation model, or its Huber-TV variant, which is normalized by a grid pitch of the relief representation model.

In one particular embodiment, the projection of the predetermined relief representation model in the epipolar geometry of the pairs of stereo images, here referred to as initial epipolar geometry, is carried out in an over-sampled epipolar geometry, and the result of the projection is subsequently under-sampled in the initial epipolar geometry.

In one particular embodiment, the result of the projection is subsequently under-sampled in the initial epipolar geometry by means of a bilinear convolution kernel performing a low-pass filtering.

In one particular embodiment, the relief representation model is a digital elevation model.

A computer program product is also provided comprising instructions for implementing the method according to any one of the embodiments presented hereinabove, when the said instructions are executed by a processor. An information storage medium (non-volatile) is also provided for storing a computer program comprising instructions for implementing the method according to any one of the embodiments presented hereinabove, when the said instructions are read from the information storage medium and executed by a processor.

A system is also provided for generating a relief representation model using a plurality of N pairs of stereo images, each of the N pairs of stereo images being associated with a map of photogrammetric disparities which is obtained by correlation calculation based on the pair of stereo images in question, the system comprising of the electronic circuitry configured for implementing the following iterative steps: calculation of maps of geometric disparities using a predetermined relief representation model, by projection of the predetermined relief representation model into an epipolar geometry of the pairs of stereo images; calculation of a cost function, representative of a difference between the geometric and photogrammetric disparities, associated with the predetermined relief representation model; and updating of the predetermined relief representation model by optimization of the gradient descent type of the cost function, and iteration until a predefined endpoint criterion is reached.

BRIEF DESCRIPTION OF THE DRAWINGS

The following description of at least one embodiment is established in relation with the appended drawings, amongst which.

DETAILED DESCRIPTION OF THE PREFERRED EMBODIMENTS

Figure 3:
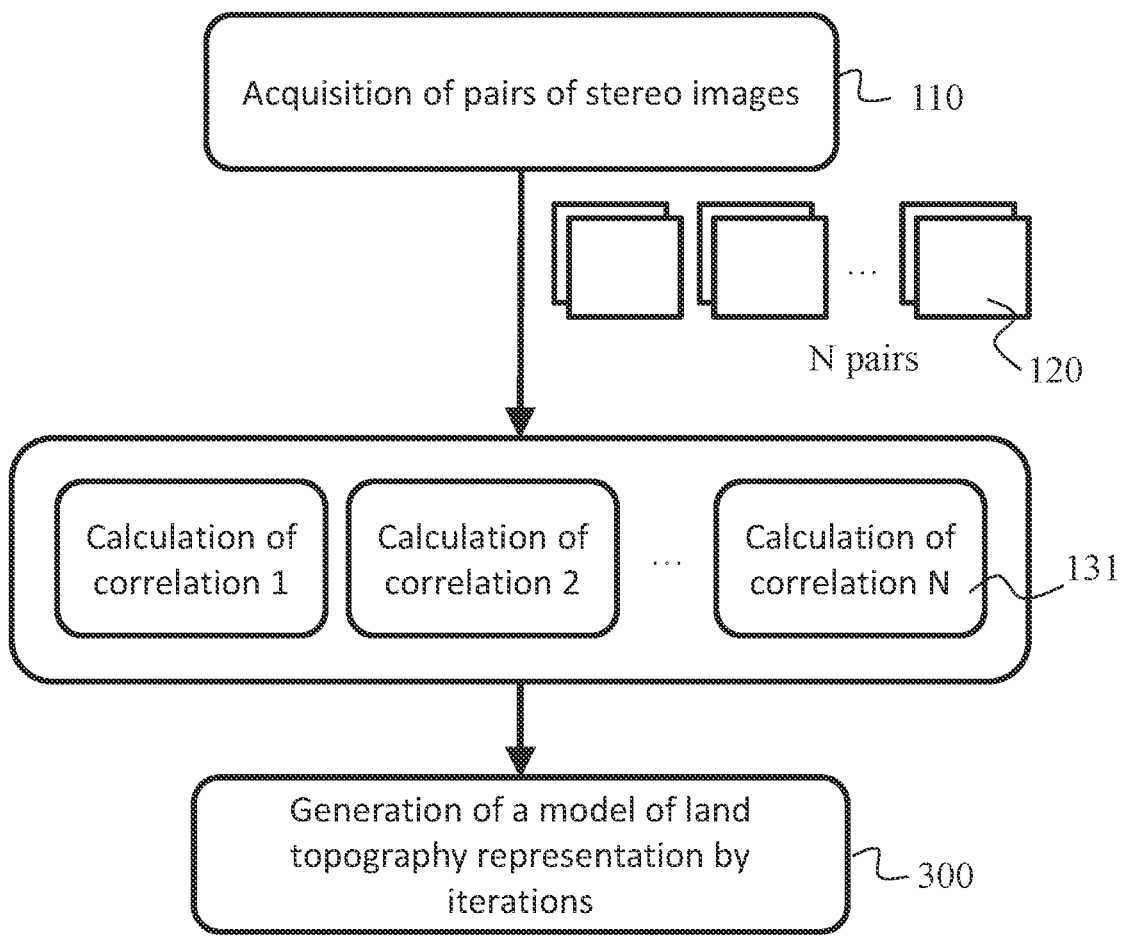
FIG. 3 illustrates schematically a flow diagram of an algorithm for generating a relief representation model for a region of interest or an area of interest, in one embodiment of the present invention.

FIG. 3 illustrates schematically a flow diagram of an algorithm for generating a relief representation model, in one embodiment of the present invention.

FIG. 3 recaptures the step 110, in which a data processing system obtains a plurality of pairs of stereo images of the scene, thus constituting a set of N pairs of stereo images 120 covering a region of interest ROI or an area of interest AOI.

FIG. 3 also recaptures, for each of the N pairs of stereo images, the step 131 for calculating the correlation between the stereo images of the said pair of stereo images. One particular embodiment is detailed hereinafter in relation with FIG. 5. Following the step 131, the algorithm in FIG. 3 differs from that in FIG. 1, as detailed hereinafter, in relation particularly with FIG. 6.

Thus, following the step 131, the data processing system carries out a step 300 for generating a model representing the relief by iterations, in order to form the finished model representing the relief of the region of interest ROI or of the area of interest AOI directly based on all of the unitary correlation results. The algorithm in FIG. 3 thus avoids the conversion into unitary relief representation models and the need to merge N unitary relief representation models, a fact which limits the loss of information.

The model representing the relief thus obtained by iterations may be a digital surface model (DSM), or a digital elevation model (DEM), or a triangular mesh.

Figure 4:
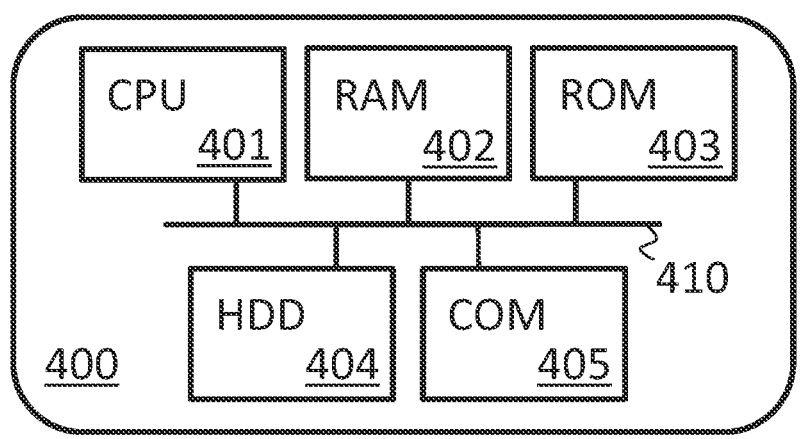
FIG. 4 illustrates schematically one example of hardware architecture of a data processing system allowing the implementation of the algorithm in FIG. 3.

FIG. 4 illustrates schematically one example of hardware architecture 400 of a data processing system allowing the algorithm described hereinabove in relation with the FIG. 3 to be executed.

The data processing system then comprises, connected via a communications bus 410: a processor or CPU (Central Processing Unit) 401, or a cluster of such processors, such as for example GPUs (Graphics Processing Units); a volatile memory RAM (Random Access Memory) 402; a non-volatile memory ROM (Read Only Memory) 403, or a re-writable memory of the EEPROM (Electrically Erasable Programmable ROM) type, for example of the Flash type; a data storage device, such as a hard disk HDD (Hard Disk Drive) 404, or a storage medium reader, such as an SD (Secure Digital) card reader; a set of input and/or output interfaces, such as communications interfaces 405, notably allowing the data processing system to interact with other equipment.

The processor 401 is capable of executing instructions loaded into the RAM 402 from the ROM 403, from an external memory (not shown), from a storage medium, such as an SD card or the hard disk HDD 404, or from a communications network. When the data processing system is powered up, the processor 401 is able to read instructions from the RAM 402 and to execute them. These instructions form a computer program causing the implementation, by the processor 401, of the steps, behaviors and algorithms described here.

All or part of the steps, behaviors and algorithms described here may thus be implemented in software form by execution of a set of instructions by a programmable machine, such as a DSP (Digital Signal Processor) or a processor, or be implemented in a hardware form by a dedicated machine or a component (or 'chip') or a dedicated set of components (or 'chipset'), such as an FPGA (Field-Programmable Gate Array) or an ASIC (Application-Specific Integrated Circuit).

Generally speaking, the data processing system therefore comprises electronic circuitry arranged and configured for implementing the steps, behaviors and algorithms described here.

Figure 5:
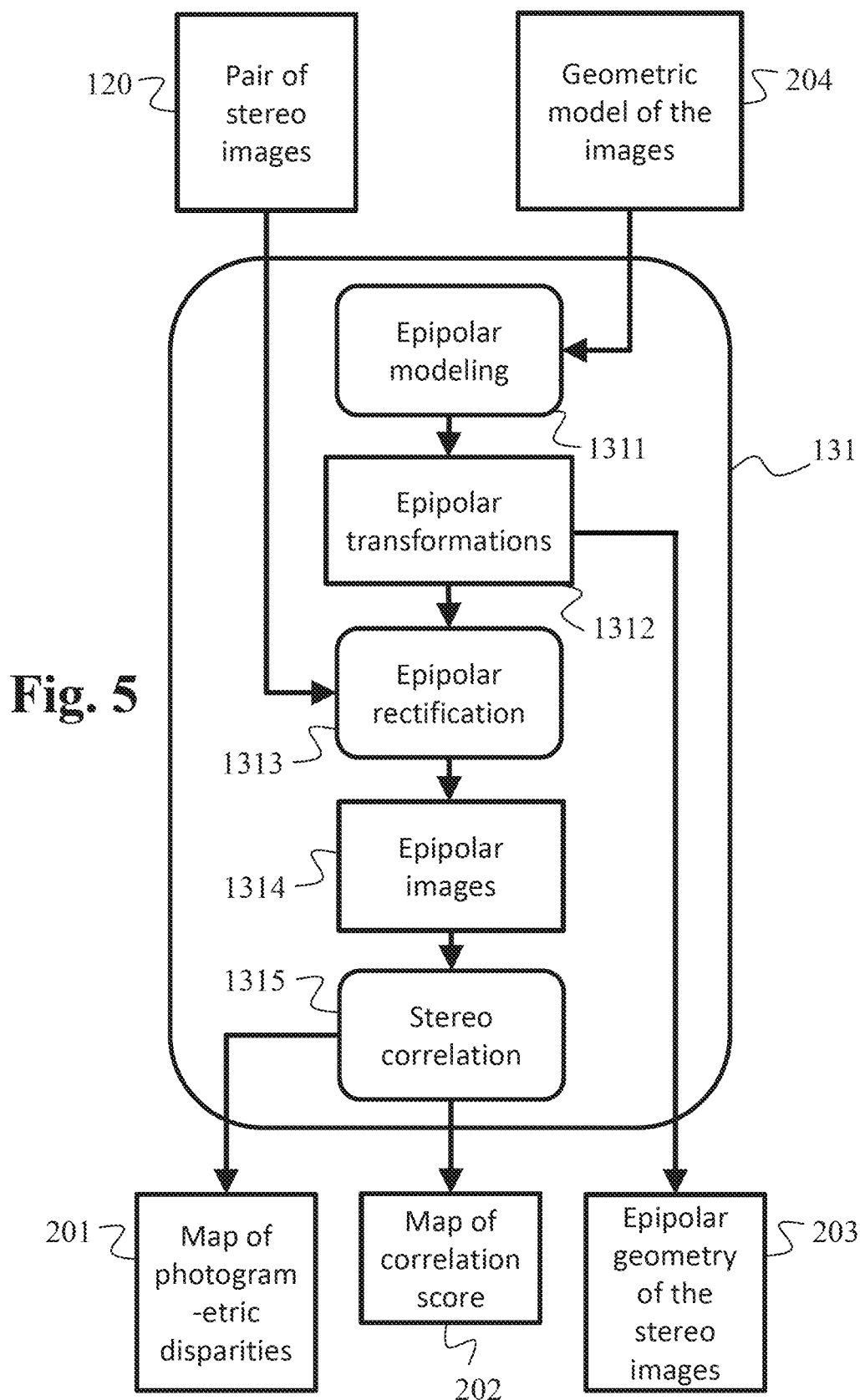
FIG. 5 illustrates schematically a flow diagram of one example of correlation calculation algorithm.

FIG. 5 illustrates schematically a flow diagram of one example of correlation calculation algorithm, corresponding to one particular embodiment of the step 131.

In a step 1311, the data processing system carries out an epipolar modelling starting from a geometric model 204 of the images from the pair of stereo images being considered. The geometric model 204 of each image provides a correspondence between coordinates of relief points (X, Y, Z) and corresponding pixel coordinates (x, y) at which this relief point is seen in the image in question. Each image being considered thus possesses its own geometric model 204.

Following the step 1311, the data processing system obtains epipolar transformations 1312 of the images. The epipolar transformation 1312 is the expression of a 2D transformation function for each image (in other works a mathematical object), bearing in mind that the same image may lead to several epipolar transformations if this image participates in several pairs of stereo images, each epipolar transformation (function) then having to be considered in the context of the pair of stereo images in which the image is considered. The combination of an epipolar transformation of an image (correspondence between (x, y), which are the points in the image being considered from the pair of stereo images in question, and (x', y'), which are the corresponding points in the epipolar image following the corresponding 2D transformation) and the geometric model 204 of this image (correspondence between (X, Y, Z) and (x, y)) defines the epipolar geometry 203 of this image (correspondence between (X, Y, Z) and (x', y'), in other words the correspondence between a relief point and an epipolar image pixel). In other words, the epipolar geometry 203 of an image is a combination of the geometric model 204 and of the epipolar transformation 1312 of this image (in the context of the pair of stereo images being considered).

Using the epipolar transformations 1312 and the pair of stereo images being considered 120, the data processing system carries out an epipolar rectification 1313 of the stereo images being considered. The stereo images in question are thus re-sampled in the epipolar geometry, in order to obtain epipolar images 1314.

Then, in a step 1315, the data processing system carries out a stereo correlation, using the epipolar images 1314, in order to produce a disparity map 201 and optionally an associated map of correlation scores 202. The data processing system applies for example, as method of stereo correlation in epipolar geometry: line by line correlation by dynamic programming, semi-global matching or neural network matching.

The correlation in epipolar geometry is typically used notably for reasons of efficiency of the correlation calculation. As a variant of a correlation calculation in epipolar geometry, the data processing system may use a method of correlation directly based on the stereo images and produce depth information equivalent to a disparity map.

It should be noted that the epipolar geometry is only rigorously defined in the case where the initial images have a geometric modelling of the 'pinhole' type (i.e., a single centre of projection for the whole image). This condition is not typically met in the case of satellite images whose geometric modelling is of the 'push-broom' type (i.e., the centre of projection moves along the path of the satellite during the acquisition of the images). In this case, a pseudo-epipolar geometry is defined, but which locally verifies the conditions of a true epipolar geometry (i.e., a 3D point is projected onto the same horizontal line in both images). It is thus considered that the geometry is also epipolar in the case of the satellite images.

Figure 6:
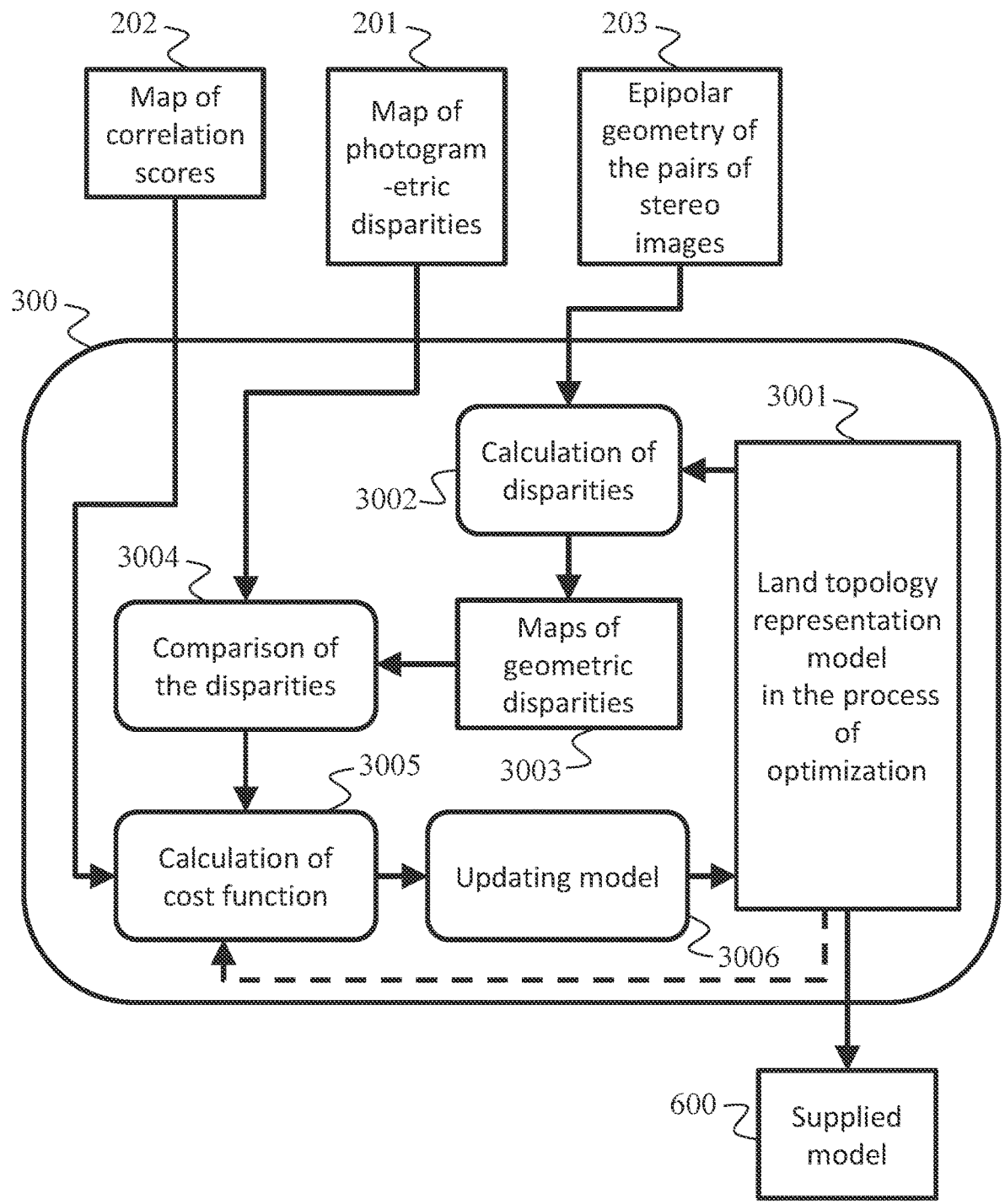
FIG. 6 illustrates schematically a flow diagram of an algorithm for generating a model representing the relief by iterations, directly from unitary correlation results, in one embodiment of the present invention.

FIG. 6 illustrates schematically a flow diagram of an algorithm for generating a model 600 representing the relief by iterations, directly based on unitary correlation results, in one embodiment of the present invention. FIG. 6 details the aforementioned step 300.

Figure 1:
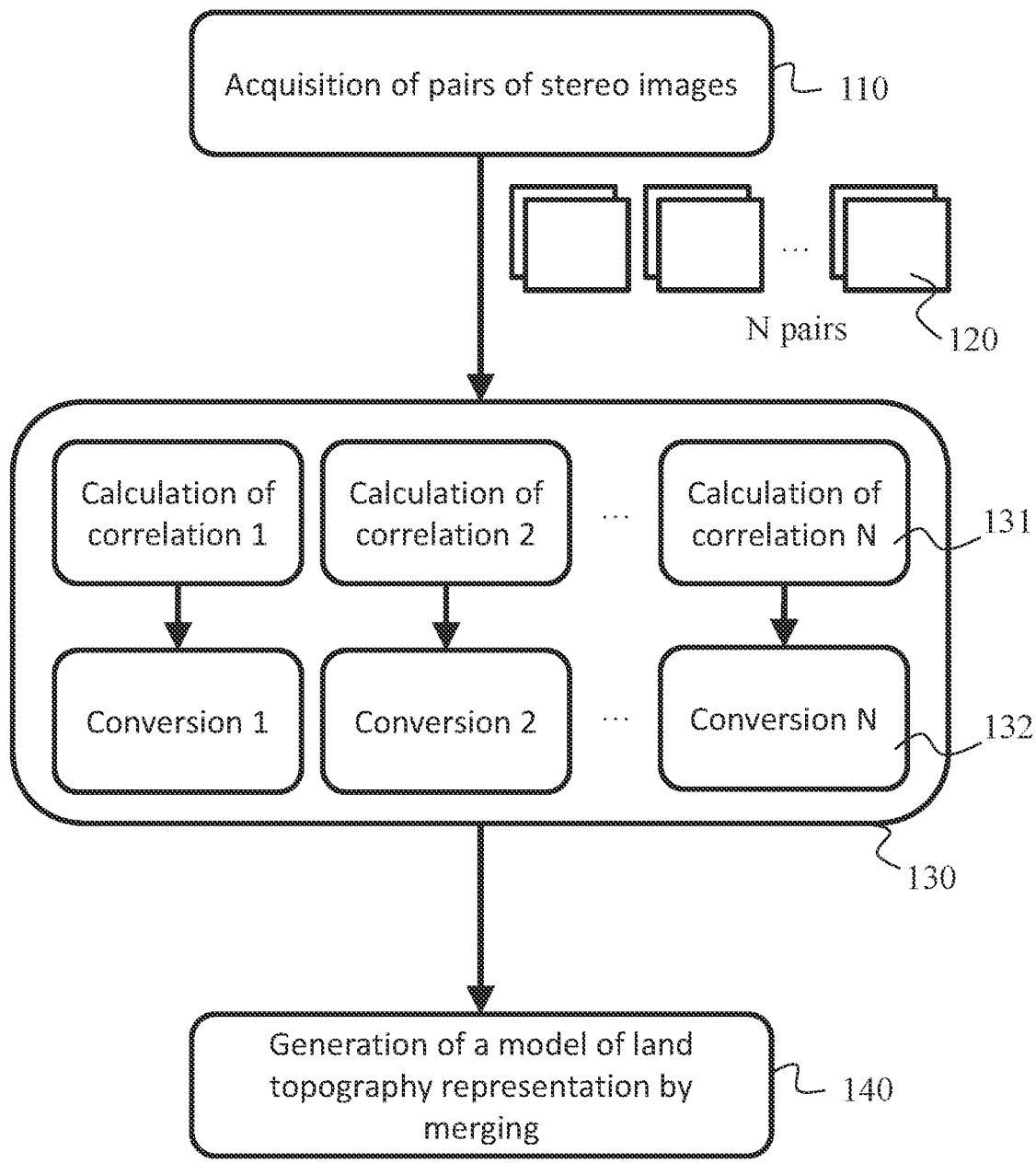
FIG. 1 illustrates schematically a flow diagram of an algorithm for generating a relief representation model for a region of interest or an area of interest, known from the prior art.
Figure 2:
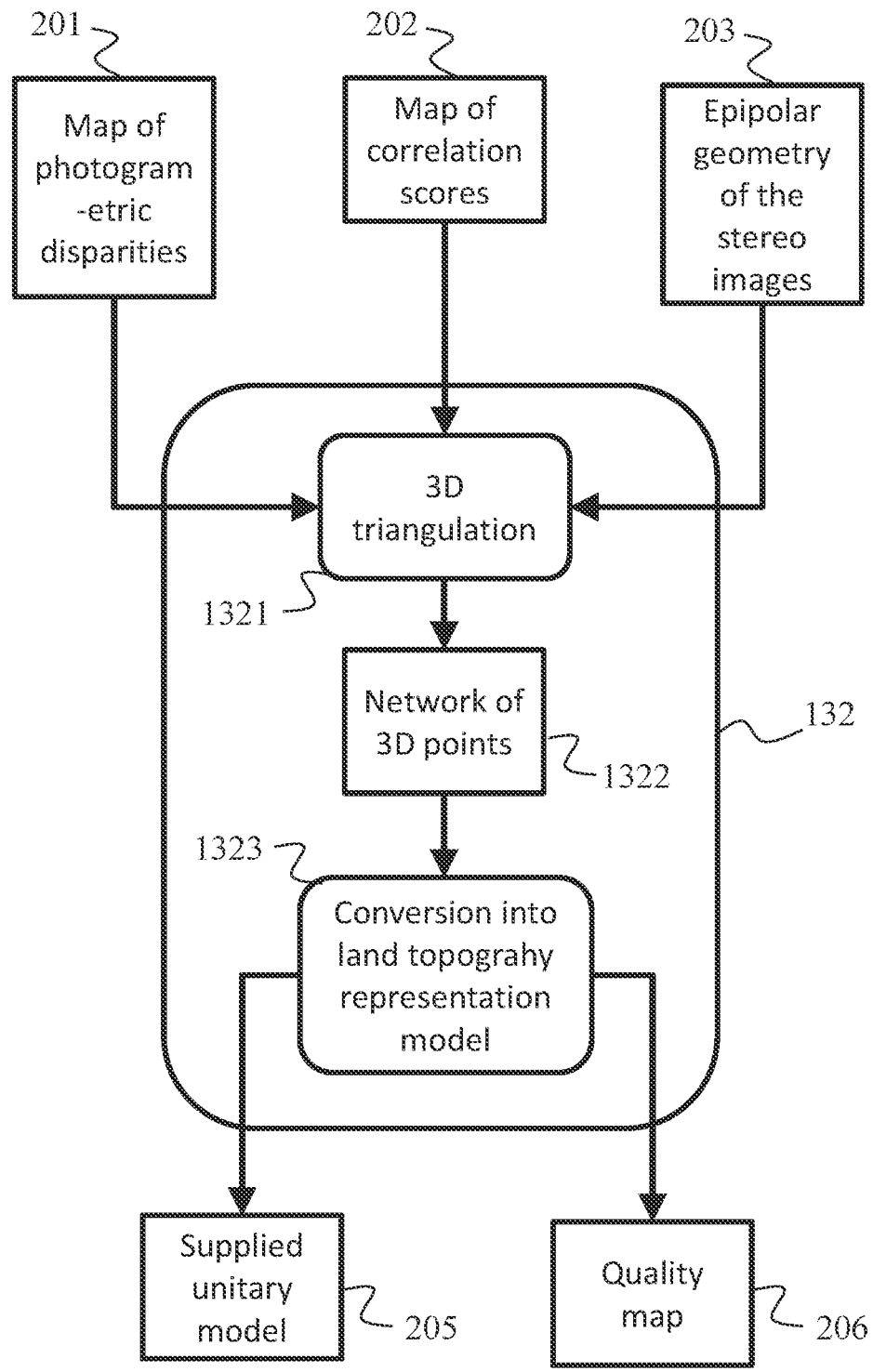
FIG. 2 illustrates schematically a flow diagram of an algorithm for converting the correlation results into unitary relief representation models, known from the prior art.

In a step 3002, the data processing system performs a calculation of disparities based on a relief representation model in the process of optimization 3001. The data processing system uses for this purpose the epipolar geometry of the pairs of stereo images 203. The relief representation model in the process of optimization 3001 is the relief representation model which is constructed in an iterative manner. For the very first iteration, this relief representation model 3001 may be loaded with a pre-established model, for example obtained by virtue of an open source database. As a variant, this relief representation model 3001 may be loaded with a plane model (e.g. a constant elevation model). In another variant, this relief representation model 3001 may be loaded with a relief representation model obtained by another method, for example by applying the approach described hereinabove in relation with FIGS. 1 and 2. Thus, the relief representation model obtained by the approach described hereinabove in relation with the FIGS. 1 and 2 is improved by virtue of the present invention.

The disparity resulting from the relief representation model 3001 in the process of optimization in a given stereo geometry is calculated by carrying out a projection of the relief representation model 3001 into the epipolar geometry of each pair of stereo images 203, and for each point of a primary epipolar image, which is also visible in a secondary epipolar image, the difference in coordinates is calculated which gives a disparity value at this point.

According to one embodiment, the projection is carried out by dividing up the relief representation model 3001 into elementary triangles (if this is not already the case for the relief representation model 3001), which are rasterized in the target geometry with which a depth buffer (called 'Z-buffer') is associated for calculating occlusions, in other words, when two or more elementary triangles are projected onto the same pixel of the target geometry, determining which triangle is above the others and is hence visible. A Z-buffer is a buffer memory managing the visibility of the elements for a visualization in 2 dimensions of an environment in 3 dimensions.

In one particular embodiment, in order to avoid problems of aliasing during the projection when the epipolar geometry is less resolved than the relief representation model 3001, the projection is performed in an over-sampled epipolar geometry, and the result is subsequently under-sampled in the initial epipolar geometry, for example by means of a bilinear convolution kernel for performing a low-pass filtering and thus eliminating undesirable high frequencies linked to the over-sampling.

Thus, if the sub-sampling factor is k, and the image to be filtered is I(x,y), the under-sampled filtered image S(x, y) is defined, for example, by $$S(x, y) = \frac{1}{C} \sum_{i=-(k-1)}^{(k-1)} \sum_{j=-(k-1)}^{(k-1)} K(i, j) I(kx + i, ky + j)$$

with $$K(i, j) = \left|\frac{i}{k}\right|\left|\frac{j}{k}\right|$$

or else $$K(i, j) = |ij|$$

and $$C = \sum_{i=-(k-1)}^{(k-1)} \sum_{j=-(k-1)}^{(k-1)} K(i, j)$$

At the end of the step 3002, maps of geometric disparities 3003 are obtained. These disparity maps are referred to as 'geometric' because they are obtained from the relief representation model 3001 in the process of optimization, as opposed to the maps of photogrammetric disparities 201 which are, in this case, obtained from each of the N pairs of stereo images 120 by means of the step 131.

Given a relief representation model (such as a digital elevation model DEM) and two epipolar images of a stereo pair, the geometric disparity resulting from the relief representation model in this epipolar geometry is thus calculated by the data processing system. Thus, for each pixel (x,y) of one of the two epipolar images, referred to as 'primary epipolar image', which sees a certain point (X,Y,Z) of the relief representation model, the data processing system determines which pixel (x+d,y) of the other epipolar image, referred to as 'secondary epipolar image', if it exists, sees the same point (X,Y,Z) of the relief representation model. The value of d thus obtained by the data processing system is the associated geometric disparity value with the pixel (x,y) of the primary epipolar image. In this approach, the data processing system takes into account cases where certain areas of the relief representation model are only visible in one of the two epipolar images because of occlusions by other relief elements.

In one particular embodiment, for a gain in processing efficiency, the data processing system transforms the relief representation model 3001 into a triangular mesh, which defines a continuous and planar surface by elements. Each quadruplet of neighboring pixels is thus divided up into four 3D triangles (hence with information on elevation of the said neighboring pixels being taken into account) around the centroid of the said neighboring pixels. Based on the representation as a triangular mesh, the calculation of geometric disparity is carried out 3D triangle by 3D triangle by the data processing system. For each 3D triangle, the data processing system calculates its projection into the primary epipolar image, then the data processing system runs through each pixel of the primary epipolar image contained inside of this 3D triangle. Each of these pixels, of coordinates (x,y), corresponds to a point (X,Y,Z) of the 3D triangle, and this point is projected into the secondary epipolar image, at the coordinates (x',y). The fact that the data processing system operates in epipolar geometry means that the coordinate y is the same in both epipolar images.

If the point (X,Y,Z) is effectively visible at the point (x',y) of the secondary epipolar image, the disparity at the pixel (x,y) of the primary epipolar image is then calculated as d=x'−x. As already indicated, it may happen that the point (X,Y,Z) is projected onto (x',y) in the secondary epipolar image, but is not visible there if it is hidden by at least one other 3D triangle which is located in front because of the corresponding elevations. The data processing system therefore performs a test of visibility of the point (X, Y, Z) at the coordinates (x', y) of the secondary epipolar image. This is carried out by calculating, prior to any calculation of disparity, which point of the relief representation model 3001 is visible to each pixel of the secondary epipolar image. Specifically, the data processing system calculates and stores, in association with each pixel of the secondary epipolar image, the altitude of the point 3D which is visible at this pixel by virtue of a Z-buffer. The data processing system can then test the visibility of the point (X,Y,Z) at the point (x',y) of the secondary epipolar image by comparing the Z value of the point (X,Y,Z) with the value of the Z-buffer at the point (x",y) of the secondary epipolar image. If these two values coincide, then the point is visible, and if the Z value of the point (X,Y,Z) is less than the value at (x',y) in the Z-buffer, then the point (X,Y,Z) is not visible in the secondary epipolar image.

Given that the point (x',y) of the secondary epipolar image onto which the point (X,Y,Z) is projected does not necessarily have an integer coordinate x', the data processing system carries out an interpolation to the closest neighbors of the content of the Z-buffer in the coordinate x'. Then, the data processing system makes a comparison of the Z value of the point (X,Y,Z) with the value of the Z-buffer at the point (x',y) of the secondary epipolar image with a predetermined tolerance (for example, a predefined fixed tolerance), which is chosen as being equal to the pitch of the grid of the relief representation model 3001.

As a complement, for testing the visibility in the primary epipolar image, as the data processing system runs through the 3D triangles, it updates a Z-buffer associated with the primary epipolar image, and if a 3D triangle is projected onto a pixel (x,y) of the primary epipolar image for which a disparity had already been calculated by virtue of another 3D triangle, the data processing system determines whether the 3D triangle newly considered is on top of the 3D triangle previously considered. If such is the case, then the data processing system updates the disparity at the pixel (x,y) with that calculated by the 3D triangle newly considered; otherwise, the data processing system conserves the disparity calculated with the 3D triangle previously considered.

In a step 3004, the data processing system performs a comparison of the maps of geometric disparities 3003 with the maps of photogrammetric disparities 201. The comparison is carried out point to point, in other words by pixel, in the disparity maps.

In a step 3005, the data processing system calculates a cost function, representative of a difference between the geometric and photogrammetric disparities, associated with the relief representation model 3001.

The cost function CF is constituted around a normalization function $N_m$ applied to each point difference coming from the comparison and summed over the all of the disparity pixels and over all of the pairs of stereo images. For example, the parameter between the quadratic part and the linear part of the Huber pseudo-norm is chosen equal to a disparity pixel. The result of the Huber pseudo-norm is preferably multiplied point to point for each pair of stereo images by the corresponding correlation score value supplied in the maps of correlation scores 202.

In one particular embodiment, if $D_k(i,j)$ is the disparity value for the pixel (i,j) in the map of geometric disparities 3003 associated with the pair of stereo images pointed to by the value of an index k, and $D_{k,0}(i,j)$ is the disparity value for the pixel (i,j) in the map of photogrammetric disparities associated with the pair of stereo images pointed to by the value of the index k, and $W_{k,0}(i,j)$ is the corresponding value for the pixel (i,j) in the corresponding map of correlation scores, the associated cost function CF is expressed thus:

$$CF = \sum_k \sum_{(i,j)} W_{k,0}(i,j) N_m(D_k(i,j) - D_{k,0}(i,j))$$

where k is a running index of the N pairs of stereo images (k=1, ..., N), in other words the value of k represents the pair of stereo images with which the map of photogrammetric disparities being considered is associated.

For example, the normalization function $N_m$ is:
The norm L1 (absolute value): $N_m(x) = |x|$
The norm L2: $N_m(x) = x^2$
In one preferred embodiment, the normalization function is:
The Huber pseudo-norm:

$$N_m(x) = \begin{cases} |x| - \frac{1}{2}, & |x| \geq 1 \\ \frac{x^2}{2}, & |x| < 1 \end{cases}$$

In one particular embodiment (symbolized in FIG. 6 by the dashed return arrow from the relief representation model 3001 to the step 3005 for calculation of the cost function), the data processing system adjusts this cost function, representative of the difference between the geometric and photogrammetric disparities, with a term R for regularization of the relief representation model 3001. Thus, the adjusted cost function ACF may be expressed as follows:

$$ACF = \lambda \cdot R + CF = \lambda \cdot R + \sum_k \sum_{(i,j)} W_{k,0}(i,j) N_m(D_k(i,j) - D_{k,0}(i,j))$$

where $\lambda$ is a weighting factor for the regularization of the relief representation model 3001 in the result of the cost function.

The weighting factor $\lambda$ depends on the context of use of the relief representation model 3001 generated and is typically defined by laboratory tests.

The term R for regularization of the relief representation model 3001 is the total variation of the relief representation model 3001, or its Huber-TV (for 'Huber Total Variation') variant, which is normalized by the grid pitch of the relief representation model 3001 so as to have a measurement with no physical unit, and hence consistent with the disparity difference sum cost term.

In the case where the relief representation model 3001 is a digital elevation model DEM, the term R for regulation of the relief representation model 3001 is preferably the variant of the total variation, called Huber-TV. Other types of regulation may be used when the relief representation model 3001 is a digital model of another type, such as a digital surface model DSM.

In a step 3006, the data processing system carries out an updating of the relief representation model 3001. The cost function having a precise analytical definition allows the data processing system to calculate its formal derivatives with respect to the variables of the problem that are the relief values of the pixels of the relief representation model 3001. Thus, the updating consists of an optimization of the gradient descent type, such as a conjugate gradient method.

The steps in FIG. 6 are iterated until a predefined endpoint criterion is reached (the endpoint criterion is a reduction in the cost less than a predefined threshold), or a predefined maximum number of iterations is reached, or a predefined maximum execution time for the step 300 is reached, or upon occurrence of an external event (for example, upon a command from an external control unit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a relief representation model using a plurality of N pairs of stereo images, each of the N pairs of stereo images being associated with a map of photogrammetric disparities obtained by correlation calculation based on the pair of stereo images in question, the method comprising the following iterative steps:
   calculation of maps of geometric disparities based on a predetermined relief representation model, by projection of the predetermined relief representation model into an epipolar geometry of the pairs of stereo images;
   calculation of a cost function, representative of a difference between the geometric and photogrammetric disparities, associated with the predetermined relief representation model; and updating of the predetermined relief representation model by optimization of a gradient descent of the cost function, and iteration until a predefined endpoint criterion is reached.

2. The method according to claim 1, wherein the cost function CF is expressed thus:

$$FC = \sum_k \sum_{(i,j)} W_{k,0}(i,j) N_m(D_k(i,j) - D_{k,0}(i,j))$$

where k is a running index of the N pairs of stereo images, $N_m$ is a normalization function, $D_k(I,j)$ is a disparity value for the pixel (I,j) in a map of geometric disparities associated with the pair of stereo images pointed to by the value of the index k, and $D_{k,0}(I,j)$ is a disparity value for the pixel (I,j) in a map of photogrammetric disparities associated with the pair of stereo images pointed to by the value of the index k, and $W_{k,0}(I,j)$ is the corresponding value for the pixel (I,j) in an associated map of correlation scores, following the calculation of correlation with the said map of photogrammetric disparities associated with the pair of stereo images pointed to by the value of the index k.

3. The method according to claim 2, wherein the normalization function $N_m$ is a Huber pseudo-norm applied thus:

$$N_m(x) = \begin{cases} |x| - \frac{1}{2}, & |x| \geq 1 \\ \frac{x^2}{2}, & |x| < 1 \end{cases}.$$

4. The method according to claim 2, wherein the cost function CF is adjusted with a term R for regularization of the relief representation model, in such a manner that:

$$ACF = \lambda \cdot R + CF = \lambda \cdot R + \sum_k \sum_{(i,j)} W_{k,0}(i,j) N_m(D_k(i,j) - D_{k,0}(i,j))$$

where $\lambda$ is a weighting factor for regularization of the relief representation model and ACF is the adjusted cost function.

5. The method according to claim 4, wherein the term R for regularization of the relief representation model is a total variation of the relief representation model, or a Huber-TV variant, which is normalized by a grid pitch of the relief representation model.

6. The method according to claim 1, wherein the relief representation model is a digital elevation model.

7. A non-transitory computer readable medium storing a computer program comprising instructions for implementing the method according to claim 1, when the instructions are executed by a processor.

8. A system for generating a relief representation model using a plurality of N pairs of stereo images, each of the N pairs of stereo images being associated with a map of photogrammetric disparities which is obtained by correlation calculation based on the pair of stereo images in question, the system comprising:
electronic circuitry configured for implementing the following iterative steps:
calculation of maps of geometric disparities based on a predetermined relief representation model, by projection of the predetermined relief representation model into an epipolar geometry of the pairs of stereo images;
calculation of a cost function, representative of a difference between the geometric and photogrammetric disparities, associated with the predetermined relief representation model; and
updating of the predetermined relief representation model by optimization of a gradient descent of the cost function, and iteration until a predefined endpoint criterion is reached.

* * * * *